(12) United States Patent
Wu

(10) Patent No.: US 7,591,672 B2
(45) Date of Patent: Sep. 22, 2009

(54) ELECTRICAL CONNECTOR FOR HOLDING A BUTTON-TYPE BATTERY

(75) Inventor: Ting-He Wu, ShenZhen (CN)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 12/319,646

(22) Filed: Jan. 9, 2009

(65) Prior Publication Data

US 2009/0181574 A1 Jul. 16, 2009

(30) Foreign Application Priority Data

Jan. 10, 2008 (CN) .................... 2008 2 0030639 U

(51) Int. Cl.
*H01R 3/00* (2006.01)
(52) U.S. Cl. .................... 439/500; 439/627; 439/68
(58) Field of Classification Search .............. 439/500, 439/68, 627, 626; 429/97–100
See application file for complete search history.

(56) References Cited

U.S. PATENT DOCUMENTS 6,062,901 A * 5/2000 Liu et al. .................... 439/500
6,087,037 A * 7/2000 Rieder ....................... 429/99
6,623,293 B1 * 9/2003 Wu .............................. 439/500
7,285,008 B2 * 10/2007 Tsai ............................ 439/500
7,390,215 B2 * 6/2008 Liao et al. .................. 439/500

FOREIGN PATENT DOCUMENTS

CN  2396427 Y  9/2000
TW  318609  10/1997

* cited by examiner

*Primary Examiner*—Hien Vu
(74) *Attorney, Agent, or Firm*—Wei Te Chung

(57) ABSTRACT

An electrical connector (100) includes an insulative housing (1), a first terminal (2) and a second terminal (3). The insulative housing defines a pair of side-arms (15) and a rear wall (14) connecting with the side-arms, thereby forming a receiving space (13) for receiving a battery (4) with an upward and forward opening therebetween. The first terminal is disposed in the front of the opening opposite to the rear wall and defines a first contacting portion (231) extending into the receiving space. The second terminal is disposed on the rear wall and defines a second contacting portion (341) extending into the receiving space. One of the pair of the side-arms (15b) is partly cut out to form a passage (16) so as to allow the battery to enter into the receiving space easily.

10 Claims, 7 Drawing Sheets

ELECTRICAL CONNECTOR FOR HOLDING A BUTTON-TYPE BATTERY

BACKGROUND OF THE INVENTION

1. Field of the Invention

The present invention relates to an electrical connector, and more particularly to an electrical connector for holding a button-type battery.

2. Description of the Related Art

An electrical connector for holding a button-type battery is required to have two contacts, which firmly hold the button-type battery in good mechanical contact. CN Pat. Issue No. 2396427Y discloses a related electrical connector which has a rectangular receiving cavity opened upwards for receiving a button-type battery therefrom. A positive terminal and a negative terminal are respectively received in the opposite front and rear walls of the receiving cavity thereof. A width of the opening equals to the diameter of the battery, so that the battery can be inserted into the receiving cavity through the opening directly. The elastic positive terminal and negative terminal clip the battery in a front-to-rear direction to retain the battery in the receiving groove. Moreover, the positive terminal is provided a hook portion extending upwards for hooking the battery to further retain the battery against upward-movement, as a result it will make the structure of the terminal complication.

TW Pat. Issue No. 318609 discloses another electrical connector for holding a button-type battery. The electrical connector defines a circular receiving cavity opening a top wall and a front wall thereof. A negative terminal is retained in the rear wall and a positive terminal is retained opposite to the negative terminal with the contacting portion projecting into the receiving cavity. The receiving cavity defines two opposite sidewalls connecting with the rear wall, and a slot is provided on an upper portion of each intersection therebetween to improve the elasticity of the sidewalls. The battery will hustle the upper portion of the sidewalls outwards during the battery is inserted into the receiving cavity from a top-to-bottom direction, and the upper portion will restore to clip the battery when the battery is completely received in the receiving cavity. But the sidewall is made of plastic material, and the sidewalls may be broken when it was hustled overly, which will destroy the electrical connector.

Hence, an electrical connector with simple structure is required.

SUMMARY OF THE INVENTION

Accordingly, an object of the present invention is to provide a electrical connector with simple structure.

In order to achieve the object set forth, an electrical connector includes an insulative housing, a first terminal and a second terminal. The insulative housing defines a pair of side-arms and a rear wall connecting with the side-arms, thereby forming a receiving space for receiving a battery with an upward and forward opening therebetween. The first terminal is disposed in the front of the opening opposite to the rear wall and defines a first contacting portion extending into the receiving space. The second terminal is disposed on the rear wall and defines a second contacting portion extending into the receiving space. One of the pair of the side-arms is partly cut out to form a passage so as to allow the battery to enter into the receiving space easily.

Other objects, advantages and novel features of the invention will become more apparent from the following detailed description of the present embodiment when taken in conjunction with the accompanying drawings.

BRIEF DESCRIPTION OF THE DRAWINGS

FIG. 6 and FIG. 7 are cross-sectional views of the connector taken along line 6-6 of FIG. 4, wherein FIG. 7 shows the completely insertion of the battery in the electrical connector.

DETAILED DESCRIPTION OF THE INVENTION

Figure 1:
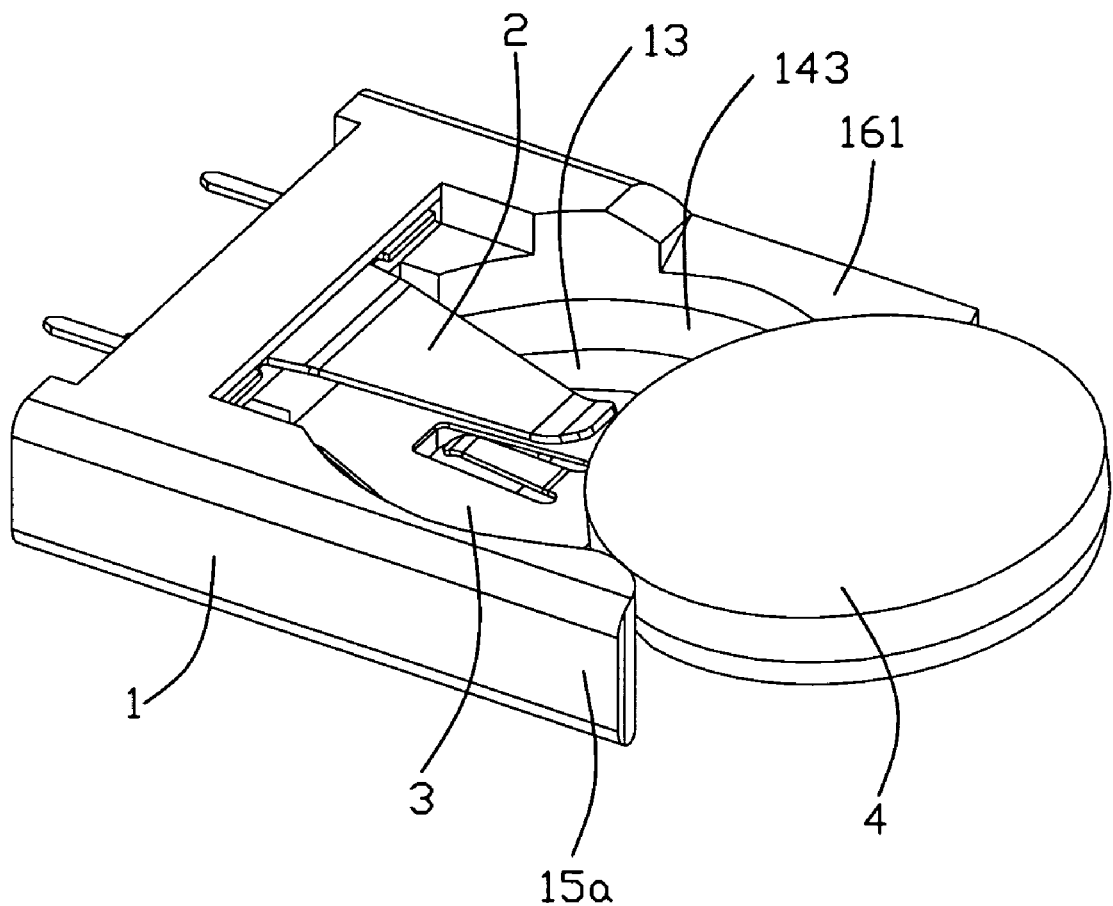
FIG. 1 is a perspective view of an electrical connector for being inserted by a button type battery in accordance with the present invention.

Reference will now be made to the drawing figures to describe a preferred embodiment of the present invention in detail.

Figure 2:
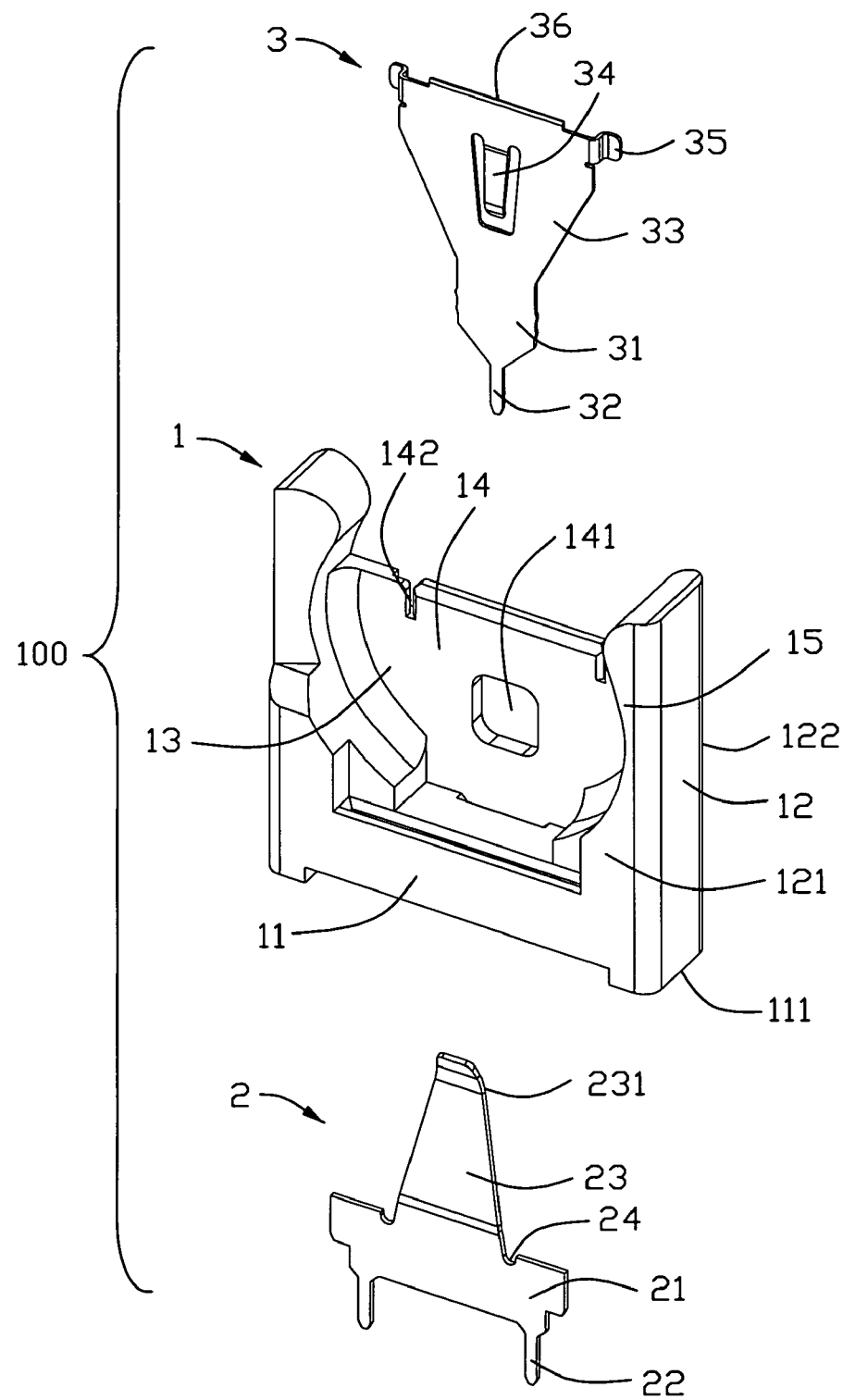
FIG. 2 is an exploded view of the electrical connector shown in FIG. 1.

Referring to FIG. 1 and FIG. 2, an electrical connector 100 for connecting a button-type battery 4 to a printed circuit board, includes an insulative housing 1 and a first and a second terminals 2, 3 received in the housing 1.

Figure 3:
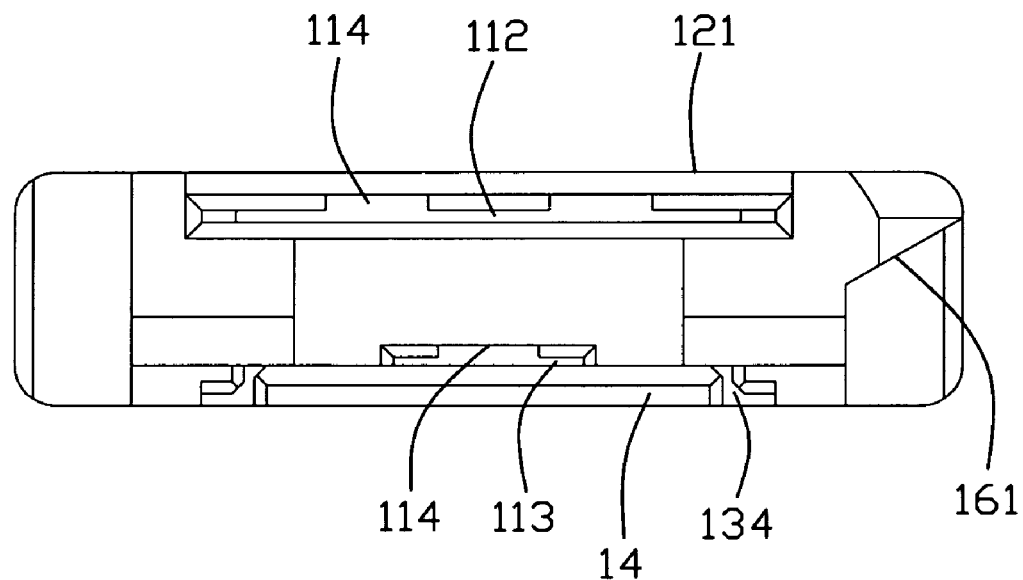
FIG. 3 is a top plan view of an insulative housing shown in FIG. 2.
Figure 4:
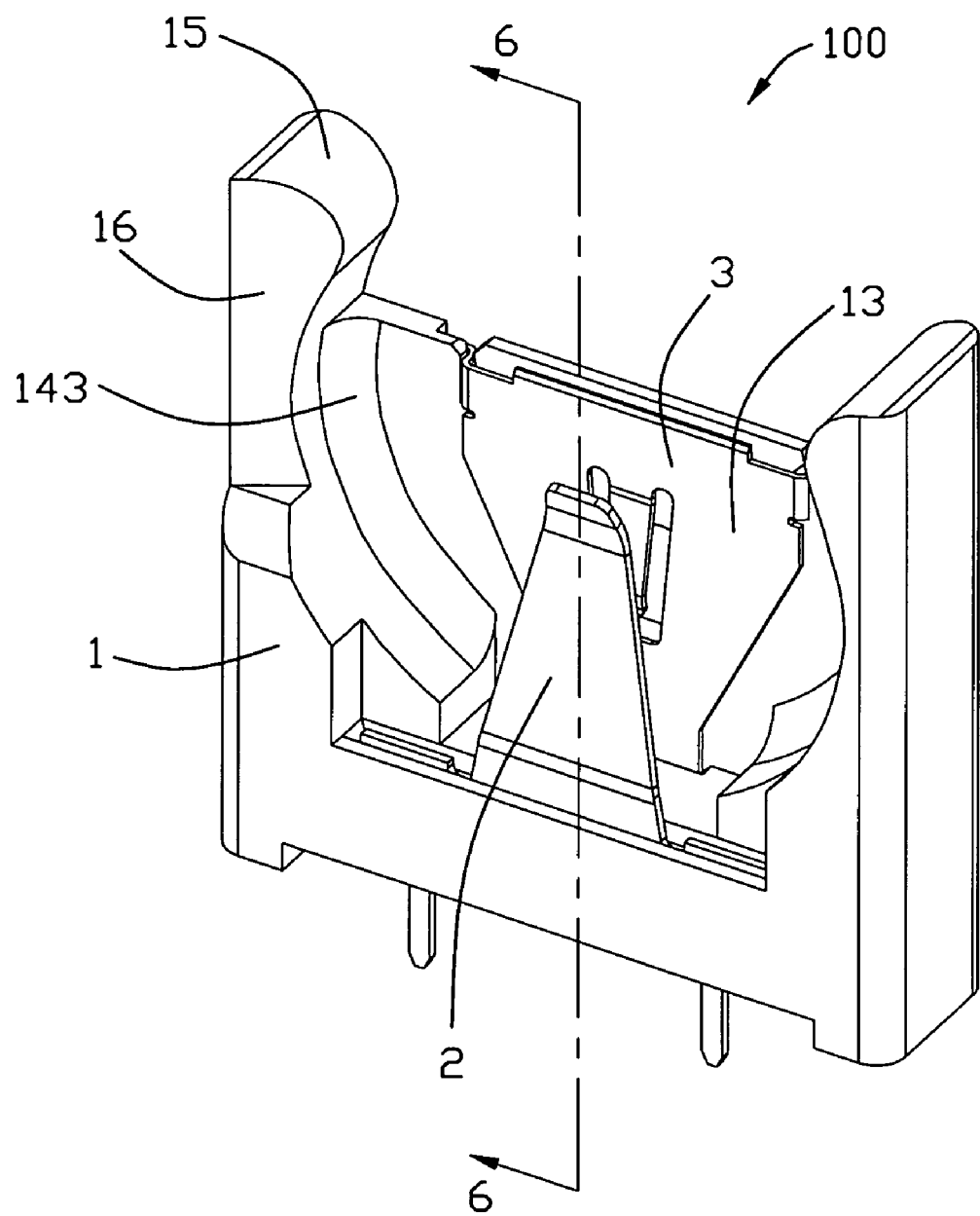
FIG. 4 is a perspective view of the electrical connector.

Referring to FIG. 2, the insulative housing 1 defines a mounting face 111, a larger front face 121, a larger rear face 122 opposite to the front face 121 and two opposite side faces connecting to the front and rear faces 121, 122. The front face 121 and rear face 122 both extend upwards and are vertical to the mounting face 111. The insulative housing 1 has a base portion 11 and a receiving portion 12 extending upwards from the base portion 11. The receiving portion 12 defines a pair of side-arms 15 and a rear wall 14 connecting with the side-arms 15, thereby forming a circular receiving space 13 with an upward and forward opening therebetween. The two opposite side-arms 15 are positioned on two sides of the receiving space 13. The side-arms 15 and the rear wall 14 are connected without any slots at intersections therebetween. The rear wall 14 defines a through hole 141 at the middle portion thereof. Referring to FIG. 3, the base portion 11 defines a first receiving groove 112 and a second receiving groove 113 both extending downwards and running through the mounting face 111. The first receiving groove 112 is adjacent to the front face 121 and the second receiving groove 113 is adjacent to the rear face 122. The first and second receiving grooves 112, 113 each defines a plurality of recesses 114 for reducing the contacting area between the receiving grooves 112, 113 and the corresponding terminals 2, 3, which can prevent the first and second terminals 2, 3 from being destroyed when the housing 1 is distortion.

Figure 6:
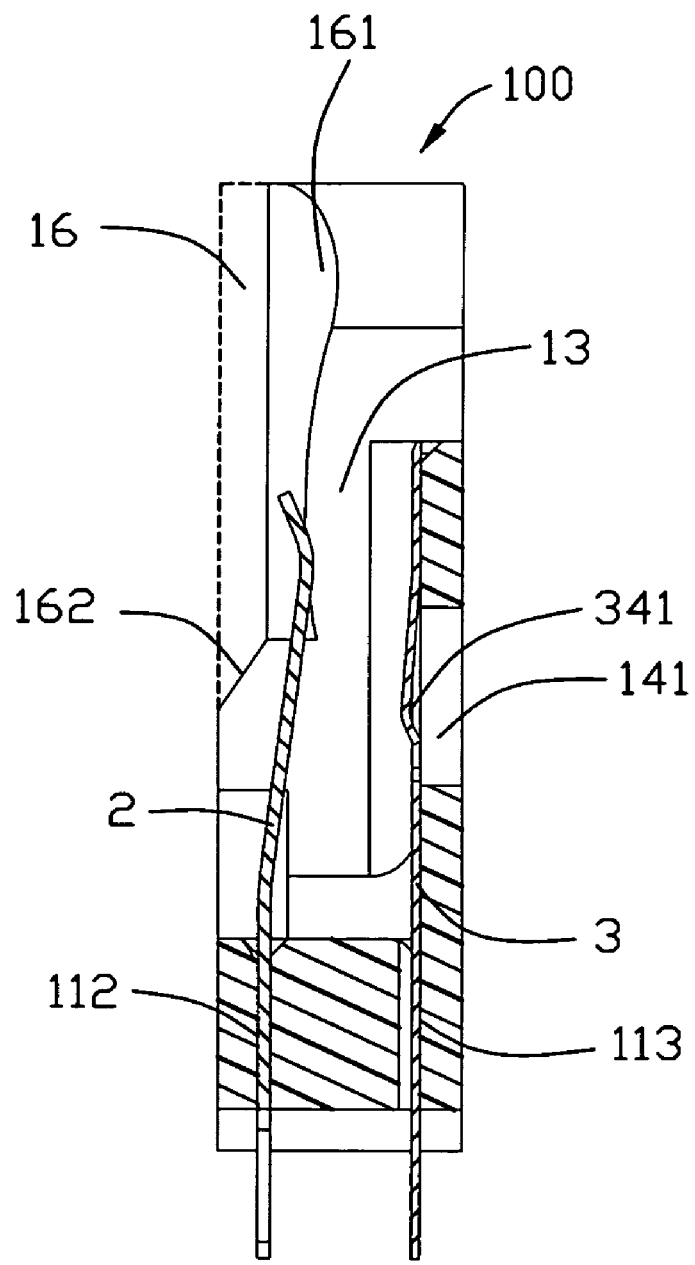

Referring to FIG. 2, the first terminal 1 is a positive terminal, which is formed with a metal piece. The first terminal 1 defines a first retaining portion 21, a pair of soldering portions 22 extending downwards from a bottom edge of the first retaining portion 21, and an elastic arm 23 extending upwards from an upper edge of the retaining portion 21. The elastic arm 23 has a first contacting portion 231 at a free end thereof. Referring to FIG. 3 and FIG. 6, the retaining portion 21 is retained in the receiving groove 112, and the elastic arm 23 extends slantways to the receiving groove 13. The elastic arm 23 is a deltoid shaped with a wider lower portion so as to strengthen the lower portion of the elastic arm 23. The retaining portion 21 further defines two open-upwards gaps 24 at top sides thereof so as to widen the intersection of the elastic arm 23 and retaining portion 21, which can prevent the elastic arm 23 from being destroyed while insertion of the battery 4.

Referring to FIG. 2, the second terminal 3 is a negative terminal, which is formed with a flat metal piece. The second terminal 3 defines a second retaining portion 31, a soldering portion 32 extending downwards from the second retaining portion 31, and a contacting board 33 extending upwards from the second retaining portion 31. The contacting board 33 defines an elastic portion 34 extending downwards at the middle portion thereof. Referring to FIG. 3 and FIG. 6, the elastic portion 34 defines a second contacting portion 341 at a free end thereof. The second retaining portion 31 is retained in the second receiving groove 113, wherein the contacting board 33 is attached to an inner surface of the rear wall 14 and the second contacting portion 341 extends into the receiving space 13 to guide the battery 4 to enter into the receiving space 13. The contacting board 33 further defines a pair of L-shaped fixing portions 35 which extend outwards respectively from two opposite side edges of a top portion thereof. The fixing portions 35 are retained in the corresponding slots 142 provided by the rear wall 14. The contacting board 3 defines a locking portion 36 extending to the rear wall 14 from a top edge thereof. The second terminal 3 is retained on the rear wall 14 by the fixing portions 35 being retained in the corresponding slots 142 and the locking portion 36 being locked to the top portion of the rear wall 14.

Figure 5:
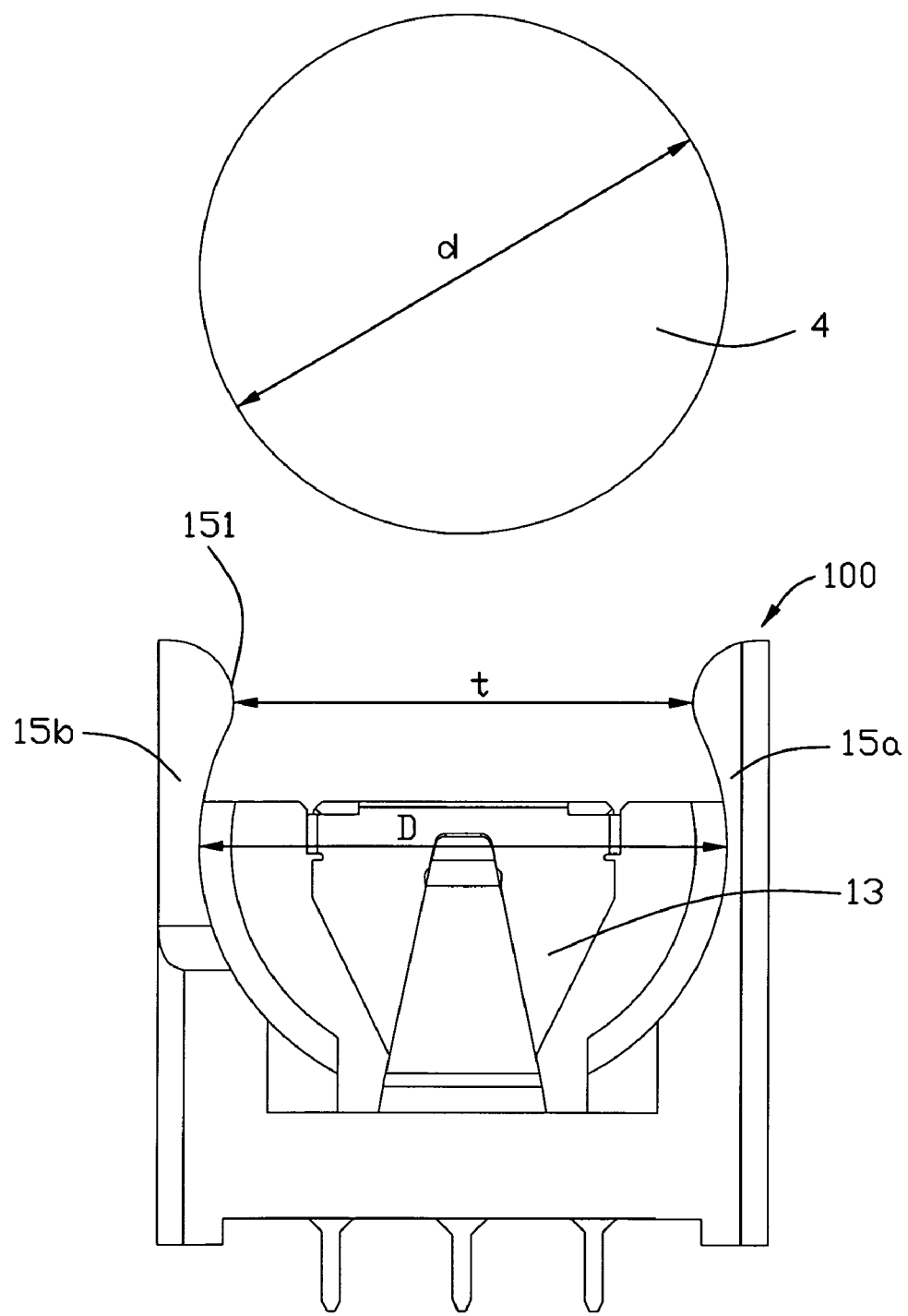
FIG. 5 is a front perspective view of the electrical connector, wherein the battery will be inserted into the connector.

Referring to FIG. 5, the first and second terminals 2, 3 both expose to the receiving space 13, and the first terminal 2 and the second terminal 3 face to each other in the front-to-rear direction. The opposite inner surfaces of side-arms 15 are arc shaped, the closest portion between the two opposite arcs are provided as blocking portions 151, between which a space is defined with a distance "t". The space therebetween has the shortest length between the opposite side-arms 15, and functions as the opening of the receiving space 13. The distance "t" is smaller than both the diameter "d" of the battery 4 and the diameter "D" of the circular receiving space 13. The diameter "d" of the battery 4 is equal to the diameter "D" of the circular receiving space 13. Referring to FIG. 1 and FIG. 5, one side-arm 15b is partly cut out to form a passage 16 which allows a battery 4 to enter into the receiving space 13 easily. The surface 161 of the passage 16 is provided as a guiding face which reaches the inner face and the top face of said one side-arm and slants towards the rear wall 14. The side-arm 15b adjacent to the passage 16 defines a slanting face 162 reaching the passage 16 from the front face 121. The side-arm 15b is lower than the other side-arm 15a in a direction vertical to the rear wall 14.

Figure 7:
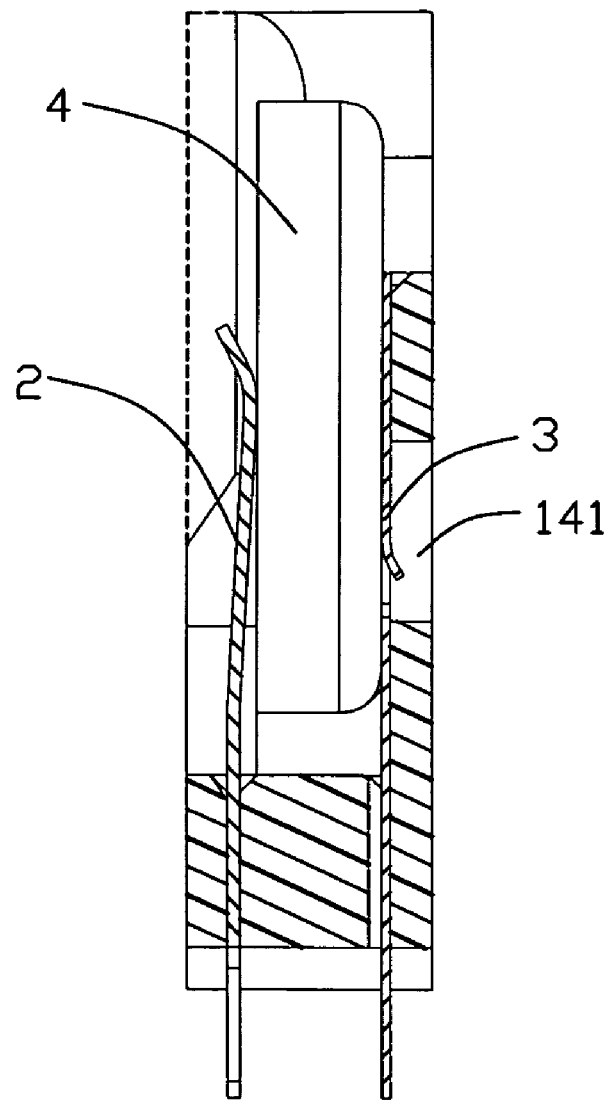

Referring to FIG. 1 and FIG. 6, during assembly, one side periphery of the battery 4 moves along the side-arm 15a, and the opposite side periphery moves along the guiding face 161 to enter into the receiving space 13. The slanting face 162 can reduce the engagement between the battery 4 and the receiving portion 16, which can make the battery enter into the receiving space 13 smoothly. The arched face 143 provided at the joint of the rear wall 14 and the side-arms 15 engages with the corresponding portion of the battery 4 to ensure the battery 4 to enter into the receiving space 13 in a natural state. Referring to FIG. 5 and FIG. 7, the distance "t" of the upward opening is smaller than the diameter "d" of the battery 4, and the battery 4 will be retained in the receiving space 13 steadily and will not break off from the opening by blocked by the blocking portions 151. The first and second terminals 2, 3 will clip the battery 4 in the front-to-rear direction to further retain the battery 4 in the receiving space 13.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector comprising:
    an insulative housing defining a pair of side-arms, a rear wall having slots at a top edge portion and the rear wall connecting with the side-arms, thereby forming a receiving space for receiving a battery with an upward and forward opening therebetween;
    a first terminal disposed in the front of the opening opposite to the rear wall, defining a first contacting portion extending into the receiving space; and
    a second terminal disposed on the rear wall, defining a second contacting portion extending into the receiving space;
    wherein one of the pair of the side-arms is partly cut out to form a passage so as to allow the battery to enter into the receiving space easily;
    wherein the pair of side-arms each have an inner face facing to each other, the passage defines a guiding face reaching the inner face and a top face of said one side-arm;
    wherein the first terminal defines an elastic arm, the first contacting portion is disposed on a free end of the elastic arm; and
    wherein the second terminal defines a contacting board having fixing portions and a lock portion attached to the top edge portion of the rear wall, the contacting board defines an elastic portion at the middle portion thereof, the second contacting portion is disposed on a free end of the elastic portion.

2. The electrical connector as described in claim 1, wherein the guiding face slants toward the rear wall and the receiving space.

3. The electrical connector as described in claim 2, wherein the two side-arms and the rear wall are connected without any slots at intersections therebetween.

4. The electrical connector as described in claim 1, wherein the inner surfaces of the side-arms are arc shaped, a blocking portion is defined on each inner surface in a condition that a space between the two opposite blocking portion has a shortest length between the opposite inner surfaces.

5. An electrical connector for use with a coin type battery, comprising:
    an insulative housing having a base portion defining thereof a longitudinal direction and a transverse direction perpendicular to each other;
    a pair of opposite side arms upwardly extending at two opposite longitudinal ends thereof, said pair of side arms defining a pair of arc interior faces opposite to each other in said longitudinal direction for compliance with a contour of the coin type battery so as to form a battery receiving cavity among the base and said pair of side arms, a rear wall having slots at a top edge portion and the rear wall connecting with the side arms;
    a pair of terminals disposed by two opposite sides of the battery receiving cavity in said transverse direction, one of said terminals being deflectable in said transverse direction; wherein one of said side arms defines a cutout adjacent to said one of the terminals to allow said battery receiving cavity to communicate with an exterior in the longitudinal direction via said cutout for facilitating insertion of the coin type battery from the exterior into the battery receiving cavity at least via said cutout at least in said longitudinal direction under condition of deflection of said one of the terminals in said transverse direction;

wherein said cutout is defined beside an oblique face of said one of said side arms adjacent to the corresponding interior face;

wherein said housing further includes a side wall located beside said battery receiving cavity in said transverse direction and supporting the other of said terminals; and wherein said other of the terminals defines a lower retention section to retain said other of the terminals in position without movement in a vertical direction, and an upper retention section having fixing portions and a lock portion attached to the top edge portion of the rear wall to retain said other of the terminals in position without movement in said transverse direction.

6. The connector as claimed in claim 5, wherein said pair of side arms are essentially not deflectable.

7. The connector as claimed in claim 5, wherein said housing further includes a said wall located by one side of the battery receiving cavity in said transverse direction and combing said pair of side arms in said longitudinal direction.

8. The connector as claimed in claim 5, wherein said pair of side arms commonly define a narrowed upper opening above the battery receiving cavity so as not to allow movement of the battery directly in a vertical direction, which is perpendicular to both said longitudinal direction and said transverse direction, without involvement of said other two directions.

9. The connector as claimed in claim 5, wherein a path of complete removal of the coin type battery from the battery receiving cavity extends in both said longitudinal direction and said transverse direction.

10. The connector as claimed in claim 9, wherein said path extends further in said vertical direction.

* * * * *